United States Patent [19]

Long et al.

[11] Patent Number: 4,798,060
[45] Date of Patent: Jan. 17, 1989

[54] EVAPORATIVE COOLER APPARATUS

[75] Inventors: Carl K. Long, 8209 Willeta Ave., Las Vegas, Nev. 89123; George E. Kozel, Las Vegas, Nev.

[73] Assignee: Carl K. Long, Las Vegas, Nev.

[21] Appl. No.: 947,030

[22] Filed: Dec. 29, 1986

[51] Int. Cl.⁴ .............................................. F28D 5/00
[52] U.S. Cl. ...................................... 62/310; 62/304; 261/140.1; 261/151
[58] Field of Search ................. 62/304, 309, 310, 311; 261/151, 83, 84, 88, 89, 108, 140.1

[56] References Cited

U.S. PATENT DOCUMENTS 2,786,406  3/1957  White .................................... 62/309

FOREIGN PATENT DOCUMENTS 22215  11/1969  Australia ............................... 62/304

Primary Examiner—Henry A. Bennet

[57] ABSTRACT

An improved portable evaporative cooler utilizes a motor-driven rotatable impeller assembly comprising an evaporator pad mounted on a support as the sole means for driving air to be cooled through the apparatus.

4 Claims, 3 Drawing Sheets

FIG. I

EVAPORATIVE COOLER APPARATUS

BACKGROUND OF THE INVENTION

This invention relates to evaporative coolers and more particularly to portable coolers designed for use in a motor vehicle, travel trailer or other movable structures. Heretofore most portable evaporative coolers have consisted of a housing enclosing a water sump, evaporative pads contained in respective pad frames upstanding from the sump and a spreader above the evaporative pads arranged to distribute water over the upper edges of the pads to percolate downwardly and return to the sump for recirculation. At the same time air is drawn inwardly through the wetted evaporative pads by a blower, evaporating some of the water and cooling the air which is blown outwardly from the cooler.

Evaporative coolers of this type that are mounted inside the space to b cooled have not provided for outside, non-saturated air, for the intake side of the evaporator pads thereby increasing the humidity of the space to the point of saturation and preventing continued evaporation and cooling by the apparatus. Moreover, such coolers are unable to prevent water contained in the sump from spilling or splashing out through the evaporative pads when the vehicle is in motion or in an unlevel position.

SUMMARY OF THE INVENTION

The apparatus of the invention comprises a case or housing of a generally rectangular configuration with a locking handle for easy portability, an attached air duct for delivering dry air to the apparatus from outside the space to be cooled, an evaporator impeller consisting of an evaporative pad held in cylindrical shape by framework and rotated by an attached electric motor to provide air movement through the apparatus and a water pump to deliver water from the lower level of the enclosure to a nozzle for injecting water, in the form of a fine spray, into the air intake side of the evaporator impeller. The impeller is enclosed by a shroud which directs the cooled and filtered air to an outlet and directly into the space to be cooled. The impeller, shroud combination produces roughly the same air flow as a similar sized centrifugal, or radial blower. A significant advantage of the cooler of this invention over prior art coolers is in not requiring a separate fan for moving air into and out of the apparatus. Instead, the evaporator impeller provides the single means for moving the air into and through the cooler, thereby reducing weight and costs of this apparatus.

Such an apparatus is inexpensive, lightweight, compact and easily portable, completely self-contained and of a simple and rugged construction especially suitable for use inside moving vehicles and portable structures. The cooler provides less expensive, non-polluting alternatives to refrigerated cooling especially in large commercial trucks and heavy equipment used for local transportation and construction. The apparatus of the invention may also be used for boats and other recreational vehicles having easy access to water but with a limited power supply.

These as well as other advantages will be evident from the following detailed description.

BRIEF DESCRIPTION OF THE DRAWINGS

FIG. 4 is a plan view of the shroud and air-water separator.

DETAILED DESCRIPTION OF A PREFERRED EMBODIMENT

Figure 1:
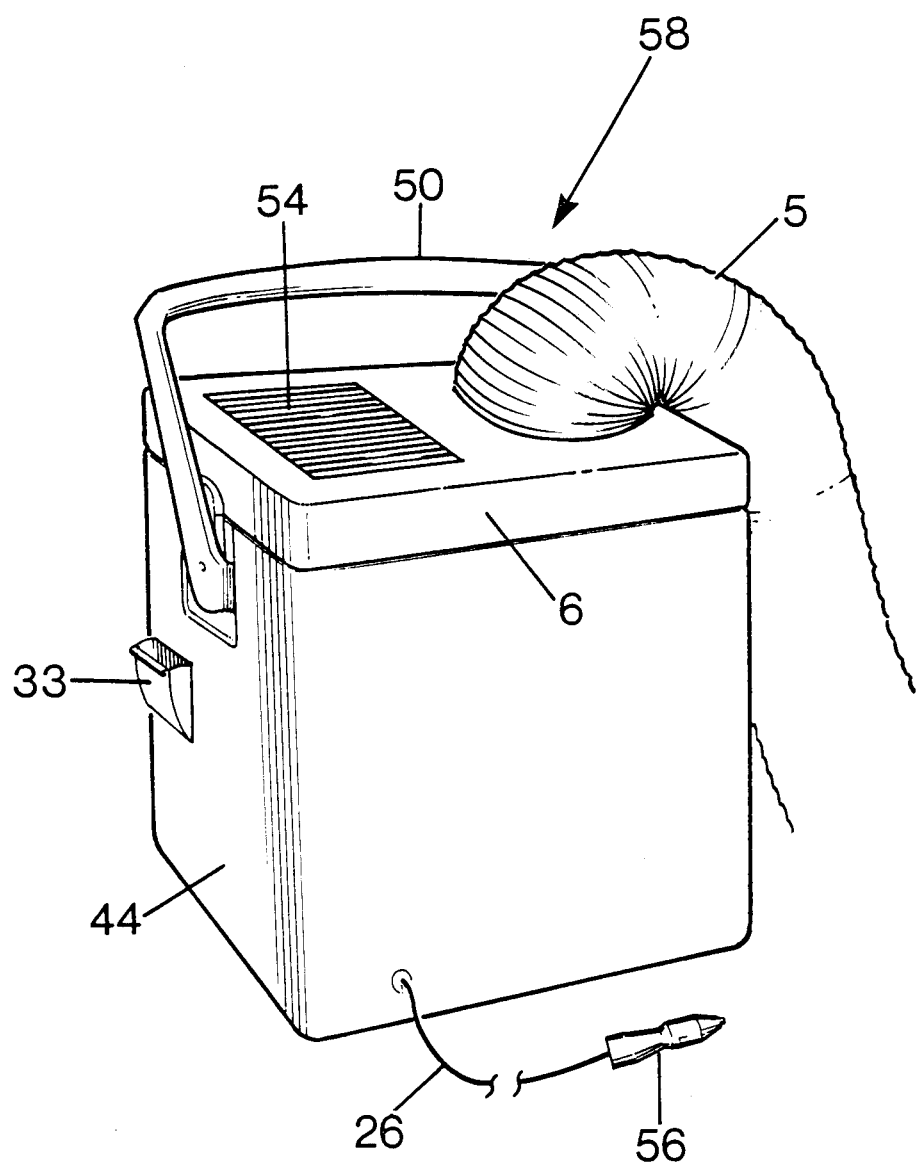
FIG. 1 is a rear perspective view of the assembled cooler apparatus.
Figure 3:
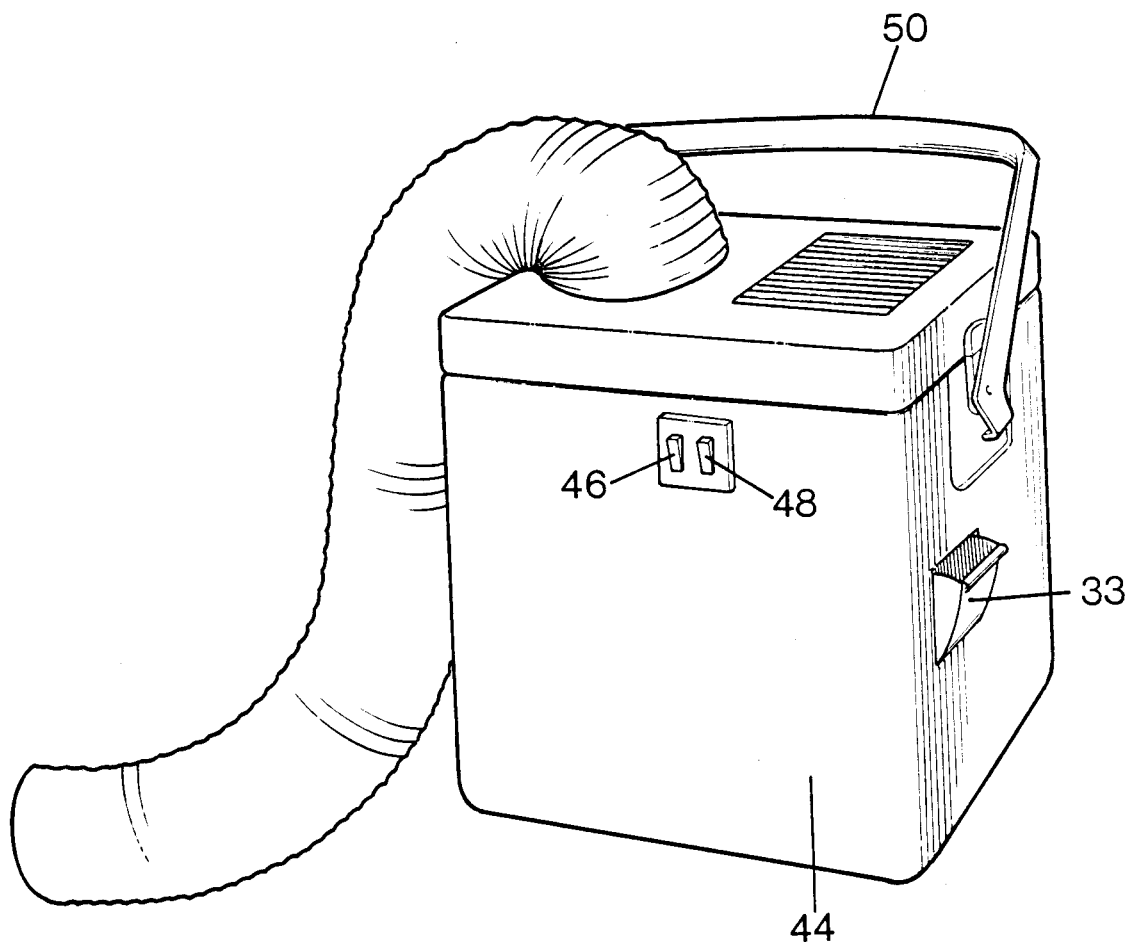
FIG. 3 is a front perspective view of the outer housing of the cooler apparatus.

As shown in FIG. 1, an enclosure for a portable evaporative cooler 58 includes a housing 44 preferably having a flat base and upstanding side walls which, when viewed from the front, is generally of a rectangular or square configuration. The housing 44 includes a water fill port 33 located slightly above the internal, full, water level. The housing also includes an opening for attachment of an electric power line 26 which has an electric cigar lighter connector attached 56. A cover 6 is attached and locked to the housing 44 by locking handle 50 designed to lock the cover in place from either the upright or lowered position. Cover 6 includes a louvered air outlet nozzle 54 and attached air inlet duct 5 with an opening for mounting the duct. Observing also FIG. 3, housing 44 includes switches 46 and 48 mounted on the upper front.

Figure 2:
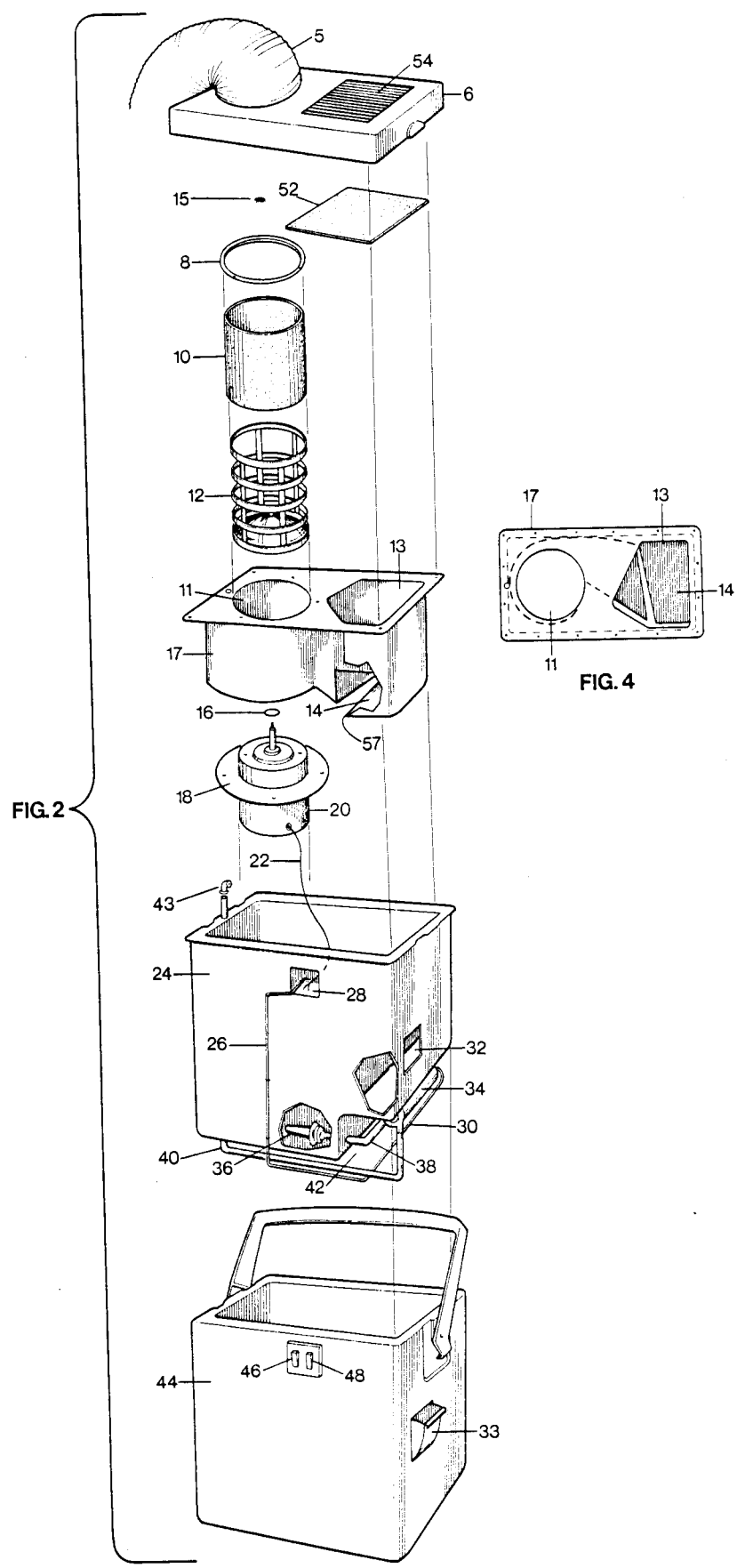
FIG. 2 is an "exploded" view of the internal parts of the cooler apparatus.

As shown in FIG. 2, aligned with and directly below air inlet duct 5 is air inlet port 11 of shroud 17. Flange 8 is attached to the upper side of shroud 17 to enclose and reduce the circumference of the inlet side of port 11. Impeller pad 10, consisting of a porous and flexible evaporative material, is designed to enclose impeller frame 12. With pad 10 covering frame 12 the impeller assembly 10/12 is attached to the drive shaft of electric motor 20 with washer 16 providing separation and held secure by retaining nut 15. Electric motor 20 is attached to the lower side of shroud 17 by mounting flange 18 which mates with the lower side of shroud 17 to form an air tight seal. A air/water separator 14 comprises a lip 57 projecting toward and slightly below the floor or lower side of the outlet of shroud 17. The above-mentioned shroud assembly is enclosed by liner insert 24 and includes electric power lead 22 attached to electric motor 20, an electric power lead 30 connected to water pump 34 enclosed in a cavity 42 and connected to water spray nozzle 43 by connecting water line 40. Water inlet line 38 is attached to water pump 34 and penetrates liner insert 24 at the lower level of the upright wall separating the interior of the liner insert 24 from the water pump cavity 42. A water inlet filter 36 is attached to the water line 38. An aperture 32 in the upright wall of liner insert is provided to mate with, pull out, water fill port 33 (see FIG. 3).

The outer housing 44 and cover 6 are preferably of the same design and construction of a common portable ice chest and provide an enclosure for liner 24 and mounting surface for electrical switches 46 and 48. Water fill port 33 provides for filling water sump in line 24 to a level slightly below the bottom of shroud insert 17. Air inlet duct 5 is attached to cover 6 and provides a conduit for the delivery of air from outside the space to be cooled through the cover 6, flange 8 and into air inlet port 11. The air is forced through impeller pad 10, which is constructed of evaporative material and intended to be replaced as needed. Impeller pad 10 is stretched over impeller frame 12 as a sleeve and is held in place by the elasticity of the evaporative material. Air is pulled into the apparatus by the rotation of the impeller assembly and forced outward due to centrifugal force, as in a radial fan, creating a partial vacuum at air inlet port 11. Air is directed to air outlet port 13 by shroud 17 then through air outlet pad 52 and air nozzle 54.

Cooling is provided by the evaporation of water that has been injected into the air inlet port 11 by water nozzle 43 thus saturating impeller pad 10. Water is delivered to impeller pad 10 by electric water pump 34 drawing water from a sump at the bottom of line 24 through filter 36, inlet water line 38 forcing water through output water line 40 to spray nozzle 43. Water, in the form of a fine mist, is directed into air inlet port 11 and onto impeller pad 10 by spray nozzle 43. Excess water that has not been evaporated will return to the sump by deflection of air/water separator. Water not evaporated, in the form of airborne droplets, is caught by and saturates air outlet pad 52 which is also constructed of evaporative material thereby producing evaporative cooling. Filtration is provided by air passing through the wetted material of impeller pad 10 and air outlet pad 52, both of which pads are disposable. Water pump 34 is controlled by electric switch 48 and impeller motor by electric switch 46 nested in cavity 28. Power is provided by main power lead 26 which is connected to the power source by cigar lighter power connector 56. Water is contained in lower portion of liner 24 and is prevented from rebounding into shroud 17 by lower lip of air/water separator 14 when wave action occurs due to abrupt movement of cooler apparatus 58.

I claim:

1. In a portable evaporative cooler comprising a housing having an air inlet and an air outlet port thereon, a water sump and sump pump means, the improvement comprising a rotatable impeller assembly comprising an evaporative pad and a frame on which said pad is supported, means for rotatably driving said impeller assembly, and a shroud around said impeller assembly, said shroud including an air/water separator extending into said sump for directing excess water from said impeller assembly and deflecting sump water away from said impeller assembly during wave action, said sump pump delivering water from said sump to said evaporative pad, whereby said impeller assembly is rotatably driven thereby creating a partial vacuum to force outside air into said cooler through said air inlet port and outwardly therefrom through said outlet port.

2. The cooler of claim 1 wherein said means for driving said impeller assembly comprises an electric motor.

3. The cooler of claim 1 wherein said air/water separator includes lip and conduit means extending into said sump.

4. The cooler of claim 3 wherein said conduit means extends between said sump and said air outlet port.

* * * * *